US008970112B2

United States Patent
Baier et al.

(10) Patent No.: US 8,970,112 B2
(45) Date of Patent: Mar. 3, 2015

(54) ACTUATION DEVICE FOR A LIGHTING DEVICE OF A MOTOR VEHICLE AND MOTOR VEHICLE

(75) Inventors: Thomas Baier, Ingolstadt (DE); Stephan Berlitz, Schrobenhausen (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/113,928

(22) PCT Filed: Apr. 19, 2012

(86) PCT No.: PCT/EP2012/001697
§ 371 (c)(1),
(2), (4) Date: Oct. 25, 2013

(87) PCT Pub. No.: WO2012/146360
PCT Pub. Date: Nov. 1, 2012

(65) Prior Publication Data
US 2014/0049160 A1    Feb. 20, 2014

(30) Foreign Application Priority Data
Apr. 26, 2011  (DE) .......................... 10 2011 018 573

(51) Int. Cl.
*B60Q 1/14* (2006.01)
*H05B 33/08* (2006.01)
*B60Q 1/00* (2006.01)
*B60Q 1/38* (2006.01)
*B60Q 1/28* (2006.01)

(52) U.S. Cl.
CPC .......... *H05B 33/0815* (2013.01); *B60Q 1/0094* (2013.01); *B60Q 1/38* (2013.01); *B60Q 1/28* (2013.01); *B60Q 2400/20* (2013.01); *B60Q 2400/30* (2013.01)

USPC .................................. 315/77; 315/80; 315/83

(58) Field of Classification Search
USPC ............ 315/77, 80–83, 88, 186; 362/20, 254, 362/511, 800; 307/10.8, 39
See application file for complete search history.

(56) References Cited

U.S. PATENT DOCUMENTS

| 6,417,623 | B1 |   | 7/2002 | Chamberlain et al. |
| 6,417,624 | B1 | * | 7/2002 | Ito et al. .......................... 315/88 |
| 7,227,460 | B2 |   | 6/2007 | Kano |
| 7,271,544 | B2 |   | 9/2007 | Ichikawa et al. |

(Continued)

FOREIGN PATENT DOCUMENTS

| DE | 10 2005 000 807 A1 | 8/2005 |
| DE | 10 2004 020 583 A1 | 11/2005 |

(Continued)

OTHER PUBLICATIONS

International Search Report issued by the European Patent Office in International Application PCT/EP2012/001697 on Jul. 5, 2012.

*Primary Examiner* — Vibol Tan
(74) *Attorney, Agent, or Firm* — Henry M. Feiereisen LLC

(57) ABSTRACT

An actuation device (4) for a lighting device (3) of a motor vehicle (1), which includes at least one LED associated with a turn signal and at least one LED associated with another type of light, in particular a daytime running light and/or a position light, and a common optical system (10) for the types of light, wherein the actuation device (4) has a single DC/DC converter (11) used for both the LEDs of the turn signal and for the LEDs of the other type of light, as well as a control unit (12) for controlling the DC/DC converter (11) in response to a control signal.

5 Claims, 1 Drawing Sheet

(56) References Cited

U.S. PATENT DOCUMENTS

| | | |
|---|---|---|
| 7,309,960 B2 | 12/2007 | Takeda et al. |
| 7,385,495 B2 | 6/2008 | Buhr et al. |
| 8,736,173 B2 * | 5/2014 | Nishitani et al. ............... 315/82 |
| 2011/0007518 A1 | 1/2011 | De Lamberterie |
| 2011/0285291 A1 | 11/2011 | Schnerr et al. |
| 2013/0119861 A1 * | 5/2013 | Vollmer ........................ 315/77 |

FOREIGN PATENT DOCUMENTS

| | | |
|---|---|---|
| DE | 10 2005 015 578 A1 | 12/2005 |
| DE | 20 2008 005 812 U1 | 10/2008 |
| DE | 10 2008 030 365 A1 | 8/2009 |
| DE | 10 2008 060 042 A1 | 9/2009 |
| DE | 10 2005 037 004 B4 | 12/2010 |
| DE | 10 2009 058 457 A1 | 6/2011 |
| EP | 1 648 204 A1 | 4/2006 |
| EP | 2 161 494 A1 | 3/2010 |
| EP | 2 270 389 A1 | 1/2011 |
| EP | 2 323 463 A2 | 5/2011 |
| WO | WO 2007/093938 A1 | 8/2007 |

* cited by examiner

US 8,970,112 B2

ACTUATION DEVICE FOR A LIGHTING DEVICE OF A MOTOR VEHICLE AND MOTOR VEHICLE

CROSS-REFERENCES TO RELATED APPLICATIONS

This application is the U.S. National Stage of International Application No. PCT/EP2012/001697, filed Apr. 19, 2012, which designated the United States and has been published as International Publication No. WO 2012/146360 and which claims the priority of German Patent Application, Serial No. 10 2011 018 573.9, filed Apr. 26, 2011, pursuant to 35 U.S.C. 119(a)-(d).

BACKGROUND OF THE INVENTION

The invention relates to an actuation device for a lighting device of a motor vehicle, which includes at least one LED associated with a turn signal and at least one LED associated with another type of light, especially a daytime running light and/or a position light, and a common optical assembly for the types of light.

It has been proposed with respect to the illumination in modern motor vehicles to combine various types of light. Accordingly, it was proposed to provide a common optical system for a daytime running light and/or position light and a turn signal (flashing light), so that these types of light—i.e. the turn signal and the daytime running light and/or position light (parking light)—appear to the external observer to be located at the same place. This is possible because the daytime running light and position light are not used simultaneously with the turn signal. The LEDs associated with the turn signal and the LEDs associated with the daytime running light and/or position light are then usually located behind the common optical system and are also controlled by a common actuation device that provides the necessary operating voltage for the type of light to be operated at that particular time. Such actuation device can also be referred to as an LED driver module.

The conventional actuation device has a DC voltage converter (DC/DC converter) for the daytime running light and/or position light and a DC/DC converter for the turn signal. A specific DC/DC converter is here associated with each type of light. This solution is expensive and complex.

SUMMARY OF THE INVENTION

It is therefore an object of the invention to improve an actuation device in such a way that it can be manufactured more easily and less expensively.

To attain this object, an actuation device of the aforementioned type includes according to the invention a single DC/DC converter which is used for both the LEDs of the turn signal and for the LEDs of another type of light and a control unit for controlling the DC/DC converter in response to a control signal.

This is based on the observation that the types of light daytime running light and/or position light and turn signal are never used simultaneously, so that the desired functionality can also be attained with a single DC/DC converter. Thus, one DC/DC converter can be eliminated, resulting in cost and weight savings. To obtain the correct output signal for the LEDs, the DC/DC converter is appropriately controlled by a control unit, in particular a microcontroller. It should be noted at this point that for realizing the daytime running light and the position light with the same LEDs, the LEDs of the daytime running light and position light may be controlled by pulse width modulation, wherein the position light can be realized, for example, with a 6-10% duty cycle, whereas the daytime running light may correspond to, for example, a 100% duty cycle. This can also be controlled via the control unit.

In an advantageous further embodiment, the actuation device has two supply inputs which are each associated with a particular type of light and two operating outputs, as well as two switching means controllable by the control unit, via which the DC/DC converter can be selectively connected to a respective supply input and a respective operating output of a type of light. Thus, corresponding switches are employed to correctly connect the input and the output of the DC/DC converter. These switching means are correctly controlled by the control unit, in particular in dependence of the control signal.

Furthermore, the DC/DC converter may be configured to operate with at least two control currents. Typically, the DC/DC converter itself has already a suitable control circuit which only has yet to be informed of the electric current at which the currently active LEDs are to be operated. This information can be stored in the control unit or can be transmitted together with the control signal, so that the DC/DC converter can be adjusted accordingly, for example, when the DC/DC converter to be operated at 50 mA and 700 mA. The control unit, in particular the microcontroller, then selects the electric current to be actually used at this time for the internal control circuit of the DC/DC converter.

In addition, the invention also relates to a motor vehicle, with an actuation device according to the invention, the lighting device and a lighting control device. The lighting control device may be connected via a control line to the actuation device, so that the control signal can be transmitted from the lighting control device to the actuation device. All embodiments with respect to the actuation device can likewise be applied to the motor vehicle according to the invention, resulting in the advantages of the invention.

BRIEF DESCRIPTION OF THE DRAWING

Further advantages and details of the present invention will become apparent from the exemplary embodiments described hereinafter and from the drawings, which show in.

DETAILED DESCRIPTION OF PREFERRED EMBODIMENTS

Figure 1:
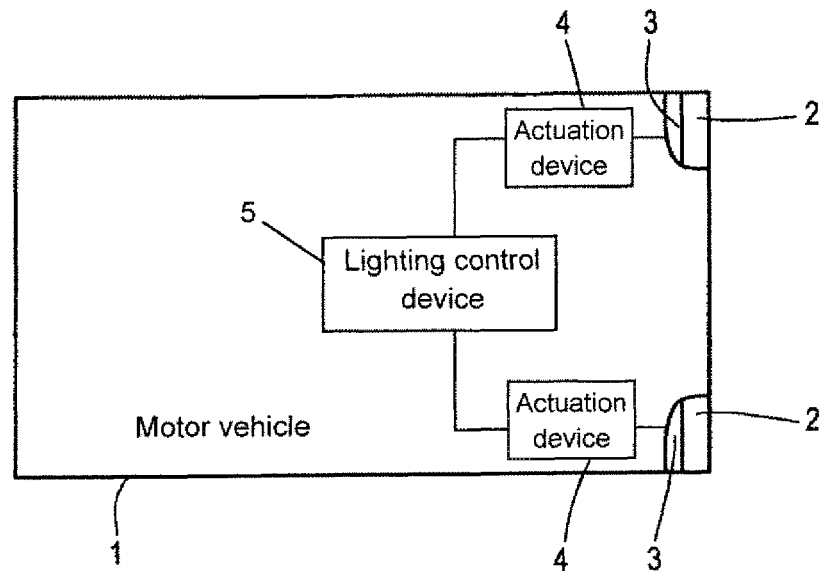
FIG. 1 a motor vehicle according to the present invention.

FIG. 1 shows a schematic diagram of a motor vehicle 1 according to the invention. The motor vehicle 1 includes two headlights 2, with a respective lighting device 3 associated with the types of light "turn signal" and "daytime running light/position light" being integrated in each of the headlights 2. Because LEDs are used for the generation of both types of light, an actuation device 4 is associated with both lighting devices 3, which may be installed, for example, directly on the lighting device 3. The actuation device 4 provides the necessary operating voltages for the operation of the LEDs of the lighting devices 3. The operation of the lighting is controlled by a lighting control device 5.

Figure 2:
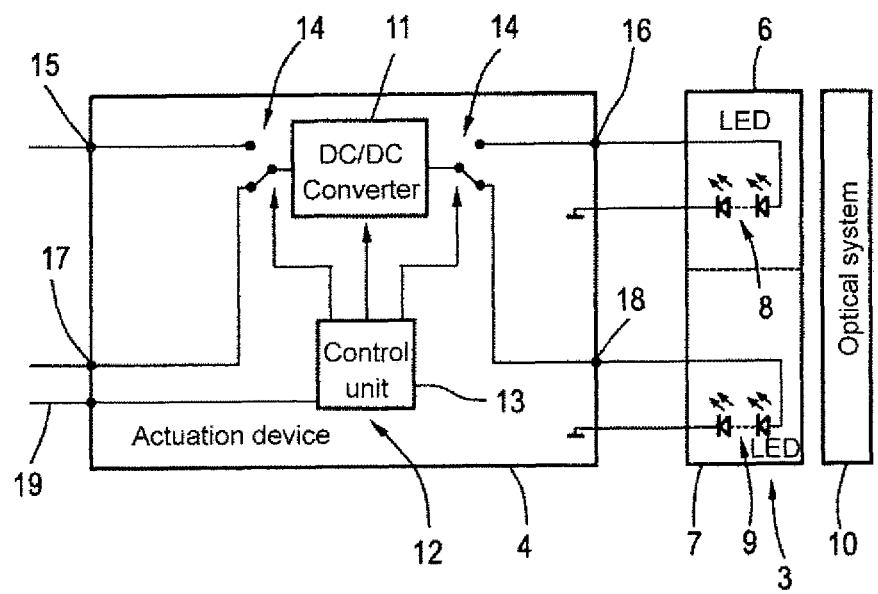
FIG. 2 a schematic diagram of the actuation device and the lighting device.

FIG. 2 shows the structure of the lighting device 3 and of the actuation device 4 in more detail. It is evident that the lighting device 3 has two LED modules 6, 7, wherein the LED module 6 contains LEDs 8 for the daytime running light/ position light. The LED module 7 contains the LEDs 9 for the turn signal. A common optical system 10 is associated with the two LED modules, 6, 7, which makes the respective light from the LED modules 6, 7 appear at the same location in the headlight 2.

Because the daytime running light/position light and the turn signal are never activated simultaneously, the actuation device 4 has only a single DC/DC converter 11 which can be controlled via a control unit 12, in the present example a microcontroller 13. The DC/DC converter 11 can also be connected via switching means 14 controllable by the control unit 12 either to a supply input 15 and an operating output 16, which are associated with the daytime running light/position light, or to a supply input 17 and an operating output 18 which are associated with the turn signal. In this exemplary embodiment, the DC/DC converter 11 is configured to operate at two control currents, namely a control current of 500 mA for the turn signal and a control current of 700 mA for the daytime running light/position light.

The necessary information for controlling the switching means 14 and the DC/DC converter 11 are supplied to the control unit 12 via a control signal which is obtained via a control line 19 from the lighting control device 5.

What is claimed is:

1. An actuation device for a lighting device of a motor vehicle, comprising:
   at least one LED associated with a first type of light configured as a turn signal,
   at least one LED associated with a second type of light different from the first type of light,
   a common optical system for the first and second types of light,
   a single DC/DC converter used for both the at least one LED of the turn signal and for the at least one LED of the second type of light,
   a control unit for controlling the DC/DC converter in response to a control signal,
   two supply inputs, each supply input associated with a respectively type of light, and two operating outputs, each operating output associated with a respectively type of light, and
   two switches controllable by the control unit for selectively connecting the DC/DC converter with a corresponding supply input and a corresponding operating output of a respectively type of light.

2. The actuation device of claim 1, wherein the second type of light comprises at least one of a daytime running light and a position light.

3. The actuation device of claim 1, wherein the DC/DC converter is configured to operate with at least two control currents.

4. The actuation device of claim 1, wherein the control unit is a microcontroller.

5. A motor vehicle comprising:
   lighting device having at least one LED associated with a first type of light configured as a turn signal, and at least one LED associated with a second type of light different from the first type of light,
   a common optical system for the first and second types of light,
   an actuation device having a single DC/DC converter used for both the at least one LED of the turn signal and for the at least one LED of the second type of light,
   a control unit for controlling the DC/DC converter in response to a control signal,
   a lighting control device supplying the control signal to the control unit,
   wherein the actuation device comprises two supply inputs, each supply input associated with a respectively type of light, and two operating outputs, each operating output associated with a respectively type of light, and two switches controllable by the control unit for selectively connecting the DC/DC converter with a corresponding supply input and a corresponding operating output of a respectively type of light.

* * * * *